Patented Nov. 13, 1951

2,574,889

UNITED STATES PATENT OFFICE 2,574,889

METHYLATED GELATIN-INSULIN PREPARATION

Ernst T. Rosenberg, Lynby, Denmark, Knut Bertil Högberg, Halsingborg, and Karl E. L. Claeson, Stockholm, Sweden, assignors to Aktiebolaget Leo, Halsingborg, Sweden, a firm No Drawing. Application September 30, 1948, Serial No. 52,132. In Denmark October 6, 1947

5 Claims. (Cl. 167—75)

This invention relates to a new insulin preparation capable of greatly prolonged insulin activity.

As is well known, in order to obtain prolonged insulin activity, it has been the practice to inject the insulin in the form of relatively insoluble preparations containing the insulin in combination with a basic proteinaceous material such as protamine, histon or globin; addition of zinc to the insulin-protamine preparation has been adopted to further reduce solubility of the insulin and increase prolongation of its activity. However, the prolongation of the insulin activity attained by the use of these preparations is not as great as might be desired, so that relatively frequent injections are still required in order to maintain the blood sugar content of diabetics at a safe level. Furthermore, the protamine-zinc insulin preparation, while showing the greatest prolongation of such preparations, does not result in immediate lowering of the blood sugar content, its effect being considerably delayed. Accordingly, it will be evident that there is an important demand for an insulin preparation which will give greater prolongation of the insulin activity, as well as an immediate lowering of the blood sugar content.

It is an object of this invention to provide an insulin preparation capable of greatly prolonging the insulin activity while at the same time giving immediate lowering of the blood sugar content.

In accordance with this invention, there is provided a preparation comprising insulin in combination with a highly methylated gelatin. This preparation, it has been found, greatly prolongs the insulin activity, and also gives an immediate insulin reaction upon injection, with rapid lowering of the blood sugar content. The insulin-methyl gelatin gelation preparations of this invention may be readily suspended in an isotonic medium and injected in the normal way; they are well tolerated in humans, since no sensitivity has been noted. It has been found that the prolongation of the insulin activity afforded by the preparations of this invention is considerably greater than that obtained with the compositions of the prior art above described, and furthermore, that the insulin reaction obtained upon injection of these compositions is extremely rapid. It is evident, therefore, that the products of this invention constitute an important advance in this field.

In the preparation of the compositions of this invention, highly methylated gelatin is employed, which has methylated until the methoxy number obtained becomes substantially constant, indicating the groups capable of methylation are substantially saturated. Such a product may be prepared by subjecting gelatin to successive methylations in an alkaline medium, e. g. aqueous caustic soda, using a methylating agent such as dimethyl sulfate, until a substantially constant methoxy number is obtained. The methylation may also be carried out in a continuous manner by a dialysis procedure, wherein caustic soda liquor and dimethyl sulfate are slowly added to a solution of gelatin separated by a dialysis membrane from running water, the reaction products other than methyl gelatin dialyzing through the membrane. The methyl gelatin is obtained in the form of an aqueous solution which is fluid at room temperature. It is soluble in water to the extent of about 60% at room temperature. Aqueous solutions thereof have a pH value ranging from about 10 to 12.

In preparing the insulin preparations of this invention, and aqueous solution of the highly methylated gelatin and insulin are combined in proportions to produce a product having a pH value between about 6.5 and about 7.5, whereby an aqueous suspension of the insulin-methyl gelatin product is obtained. If desired, a buffer, e. g. disodium hydrogen phosphate, may be included to maintain the pH of the solution within the range specified. This product may then be directly injected into the patient in the usual manner.

Comparative tests have demonstrated that the insulin-methyl gelatin products of this invention give greater prolongation of the insulin activity than preparations of the prior art, including even the protamine-zinc insulin preparation. Thus, tests have been conducted on rabbits, of 3-5 kg. in weight, in which 0.3 I. U. of insulin per kg. weight was injected, in the form of the insulin-methyl gelatin product of this invention, on the one hand, and protamine-zinc insulin on the other. Table I gives the results of such tests:

Table I

[Mg. blood sugar/100 cc. blood.]

|  | Protamine-Zinc insulin, 0.3 u./kg. | | | Methyl gelatin-insulin, 0.3 u./kg. | | |
|---|---|---|---|---|---|---|
|  | 2 hrs. | 4 hrs. | 6 hrs. | 2 hrs. | 4 hrs. | 6 hrs. |
|  | 86 | 93 | 93 | 39 | 66 | 107 |
|  | 63 | 79 | 76 | 72 | 91 | 107 |
|  | 75 | 107 | 135 | 55 | 83 | 86 |
|  | 73 | 98 | 105 | 63 | 98 | 102 |
|  | 79 | 100 | 100 | ----- | 43 | 112 |
|  | 63 | 95 | 105 | 61 | 86 | 100 |
|  | 96 | 109 | 102 | 59 | 72 | 107 |
|  |  |  |  | 61 | 59 | 89 |
| Average | 76.4 | 97 | 105.1 | 58.6 | 74.5 | 98.5 |

It is evident from the above table that since the blood sugar content of the rabbits treated with the product of this invention was consistently lower than that of the rabbits treated with protamine-zinc insulin, specifically at 6 hours, the the activity of the insulin has been significantly prolonged by the use of the preparation of this invention.

Tests have also been run on humans in which the subjects under test each received subcutaneous doses of 20 I. U. of insulin in the form of the preparation of this invention, on the one hand, and protamine-zinc insulin on the other. The subjects all received a common breakfast twelve hours after injection; in the following table, A, B, C and D denote individuals subjected to this test, these individuals being healthy adult women the value of whose blood sugar was controlled before starting the experiment. The blood sugar determinations were made four hours after feeding, i. e., sixteen hours after injection of insulin. The results of these tests are given in Table II, as follows:

*Table II*

[Mg. blood sugar/100 cc.]

| Preparation | A | B | C | D |
|---|---|---|---|---|
| Insulin methyl-gelatin | 92 | 103 | 96 | 69 |
| Protamine-zinc insulin | 138 | 155 | 119 | 131 |

The above results demonstrate that even after sixteen hours, the blood sugar in the patients treated is well under control in those injected with the preparations of this invention, whereas in the case of the protamine-zinc preparation, the blood sugar has risen to much higher values.

In another group of tests made on humans, 20 I. U. of insulin in the form of the insulin-methyl-gelatin composition of the invention, on the one hand, and protamine-zinc insulin on the other, were injected, and determination of the blood sugar value made after two hours, with the following results:

*Table III*

[Mg. blood sugar/100 cc. after 2 hours.]

| Preparation | A | B | C | D |
|---|---|---|---|---|
| Insulin methyl gelatin | 63 | 54 | 49 | 99 |
| Protamine-zinc insulin | 121 | 109 | 130 | 123 |

Table III, therefore, clearly shows that the preparations of this invention have a faster action as compared with protamine-zinc insulin; in this table also, A, B, C and D represent healthy adult women subjected to the test whose blood sugar was controlled before starting the experiment.

The following example illustrates preparation of a composition of this invention:

25 grams of gelatin were dissolved in 100 cc. of 2 N sodium hydroxide and 26 grams of dimethyl sulfate were then added dropwise, with agitation and cooling. At the end of this time, the reaction mixture was permitted to stand for 24 hours, dialyzed for 24 hours against running water, and evaporated in vacuo at 30° C. to concentrate the product. The above procedure was then repeated until 10 methylations had been carried out, at which point the methoxy number became constant.

400 I. U. of insulin were then dissolved in 5 cc. of 0.001 N hydrochloric acid and the solution mixed with a solution of 50 mg. of the methylated gelatin, prepared as above described, in 5 cc. of a 1/15 molar $Na_2HPO_4$ buffer having a pH value of 7.2. An injectable suspension of the insulin-methyl gelatin product was thereby obtained.

Since certain changes may be made in the above products without departing from the scope of the invention, it is intended that all matter contained in the above description shall be be interpreted as illustrative and not in a limiting sense. For example, instead of methylating the gelatin, it may be similarly treated to introduce other short chain alkyl groups such as the ethyl, propyl and butyl radicals, and the alkylated gelatins then used as described. Further, if desired, zinc may be included in the composition of this invention.

What is claimed is:

1. An insulin preparation displaying prolonged insulin activity comprising insulin in combination with gelatin alkylated with short chain alkyl groups.

2. An insulin preparation displaying prolonged insulin activity comprising insulin in combination with a highly methylated gelatin.

3. An insulin preparation displaying prolonged insulin activity comprising insulin in combination with gelatin methylated until the methoxy number becomes substantially constant, said preparation having a pH value between about 6.5 and about 7.5.

4. A method for preparing an insulin preparation displaying prolonged insulin activity which comprises mixing in an aqueous medium insulin and gelatin alkylated with short chain alkyl groups, while maintaining the pH value of the solution between 6.5 and 7.5, thereby to produce an aqueous suspension of the insulin-alkylated gelatin product.

5. A method for preparing an insulin preparation displaying prolonged insulin activity which comprises mixing in an aqueous medium insulin and a highly methylated gelatin while maintaining the pH value of the solution between 6.5 and 7.5, thereby to produce an aqueous suspension of the insulin-methylated gelatin product.

ERNST T. ROSENBERG.
K. B. HÖGBERG.
KARL E. L. CLAESON.

REFERENCES CITED

The following references are of record in the file of this patent:

UNITED STATES PATENTS

| Number | Name | Date |
|---|---|---|
| 2,050,558 | Bockmuhl | Aug. 11, 1936 |
| 2,190,137 | Sahyun | Feb. 13, 1940 |
| 2,292,022 | Christopher | Aug. 4, 1942 |
| 2,363,892 | Monier | Nov. 28, 1944 |

FOREIGN PATENTS

| Number | Country | Date |
|---|---|---|
| 518,624 | Great Britain | Mar. 4, 1940 |

OTHER REFERENCES

Lang, "Precipitation of Insulin by Organic Bases," in Pharmaceutical Archives, vol. 12, Nov. 1941, pp. 81–86.

Hawk, "Practical Physiological Chemistry," 12th ed., 1947, pp. 106, 168, 169.

Blackburn, Biochem., J. vol. 38, pp. 171–178 (1944).

Fraenkel-Conrat, J. Biol. Chem., vol. 161, pp. 259–268 (1945).